F. P. WHITAKER.
ELECTRICAL APPARATUS.
APPLICATION FILED NOV. 10, 1916.

1,263,976.

Patented Apr. 23, 1918.

Inventor:
Frank P. Whitaker,
by Albert G. Davis
His Attorney

UNITED STATES PATENT OFFICE.

FRANK P. WHITAKER, OF RUGBY, ENGLAND, ASSIGNOR TO GENERAL ELECTRIC COMPANY, A CORPORATION OF NEW YORK.

ELECTRICAL APPARATUS.

1,263,976.  Specification of Letters Patent.  Patented Apr. 23, 1918.

Application filed November 10, 1916. Serial No. 130,655.

*To all whom it may concern:*

Be it known that I, FRANK P. WHITAKER, a subject of the King of Great Britain, residing at Rugby, in the county of Warwickshire, England, have invented certain new and useful Improvements in Electrical Apparatus, of which the following is a specification.

The invention relates to electric apparatus, and has for its object to provide an improved construction of apparatus suitable for dealing with heavy currents.

In the design of alternating current generators, induction regulators and other apparatus it is well-known that there is a limit to the current carried by conductors through a single slot and in some cases it is undesirable to design the apparatus for more than about 1000 amperes per slot. In order therefore to build apparatus, an alternating current induction regulator for example having a stationary secondary and a movable primary, it is usual when an output of considerably more current than 1000 amperes per conductor would be required with a two pole design to provide the secondary with a number of parallel windings for each phase by increasing the number of poles. Such regulators must have a relatively large diameter in order to obtain a stator core of the circumference necessary to accommodate the windings and to find room for the increased number of poles.

According to the present invention instead of increasing the diameter of the machine or other apparatus I increase its length and divide the core lengthwise into as many sections as it is desired to connect conductors in parallel per pole, the conductors being taken through the slots in the sections so that each of the parallel conductors occupies every position in turn from one end of the apparatus or machine to the other. In this way I am enabled to provide apparatus having a heavy current output without exceeding a reasonable current per slot and with a small number of poles. Thus the apparatus or machine may have only two or four poles.

Figure 1:
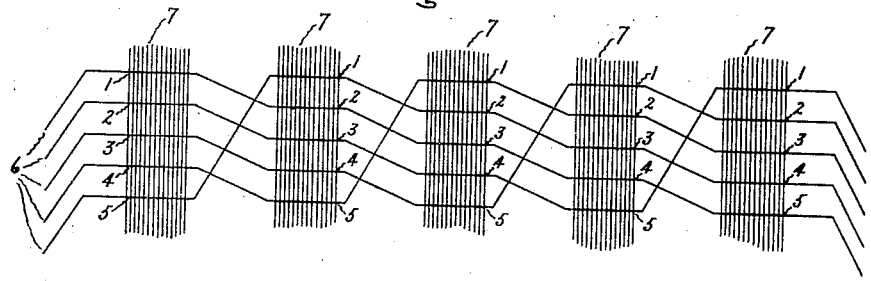
Figure 2:
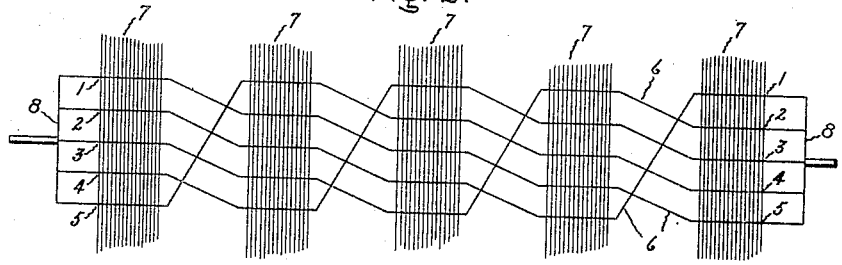

For a better understanding of my invention reference may be had to the following description taken in connection with the accompanying drawing, in which Figure 1 shows diagrammatically one embodiment of my invention; Fig. 2 shows a modification of the arrangement of Fig. 1, and Fig. 3 shows a detail of construction.

Fig. 1 of the drawing shows diagrammatically a portion of an alternator or induction regulator in which there are five conductors 6 connected in parallel per pole for each phase and the laminated core 7 is divided into five lengths or sections. The conductors are connected between the sections so that each of the parallel conductors occupies every position per phase per pole in turn in order that at any particular instant each of the parallel conductors will have induced in it the same E. M. F. Thus the bars in the slots are so connected between the core sections or the metal is so shaped that the first conductor is wound through slots 1, 2, 3, 4, 5 in the sections respectively, the second conductor through slots 2, 3, 4, 5, 1, the third conductor through slots 3, 4, 5, 1, 2, and so on. This figure represents the case where there are more than one divided conductors per phase.

In some cases, where the current per phase is very heavy and a number of conductors are coupled in parallel, end windings may be dispensed with, the parallel conductors being taken through the slots in the core sections, and connected together at 8 at each end of the machine or regulator as shown diagrammatically in Fig. 2. This figure represents the case where there is one multiple conductor only per phase.

Figure 3:
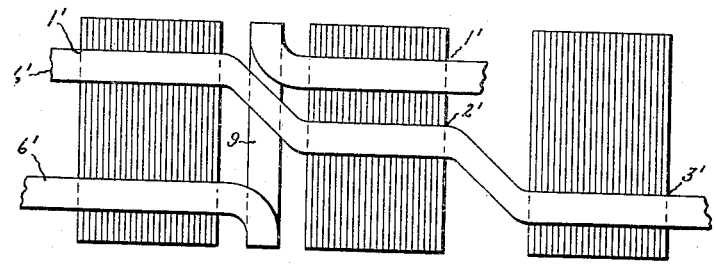

Fig. 3 shows how the conductors are connected between the sections. Conductors 6' are led through slots 1', 2', and 3', in the sections and may be bent to the required shape but where the conductor has to pass from the lowermost slot in one section to the uppermost slot in the next it will generally be preferable to provide separate intermediate conductors, such as 9, the ends of which may be connected to the bent ends of the bars to be connected and secured to them by any suitable or well-known means.

The core may, so far as the principle is concerned, be divided into a larger number of sections which is a multiple of the number of conductors in parallel per pole but usually this will be less economical than the arrangement above described in which the core is divided into just as many sections as there are conductors in parallel per pole.

The invention is applicable to various types of apparatus such as turbo-alternators, synchronous motors, induction regulators, low voltage rotary converters and other alternating current apparatus.

What I claim as new and desire to secure by Letters Patent of the United States, is:

1. An electrical apparatus comprising a core member divided into sections, a winding on said core member having a plurality of conductors per pole arranged in parallel, each of said conductors occupying a different position in each core section and occupying every position per pole in turn from one end of the apparatus to the other.

2. An electrical apparatus comprising a core member divided into sections, a winding on said core member having a plurality of conductors per phase per pole arranged in parallel each of said conductors occupying a different position in each core section and occupying every position per phase per pole in turn from one end of the apparatus to the other.

3. An electrical apparatus comprising a core member divided into sections, a winding on said core member having a plurality of conductors per pole arranged in parallel, the number of sections of said core being equal to the number of conductors in parallel per pole, each of said conductors occupying a different position in each core section and occupying every position per pole from one end of the apparatus to the other.

4. An electrical apparatus comprising a core member divided into sections, a winding on said core member having a plurality of conductors per phase per pole arranged in parallel, the number of sections of said core being equal to the number of conductors in parallel per phase per pole, each of said conductors occupying a different position in each core section and occupying every position per phase per pole in turn from one end of the apparatus to the other.

In witness whereof, I have hereunto set my hand.

F. P. WHITAKER.

Witnesses:
 CHARLES H. FULLER,
 JOHN HALFORD.

Copies of this patent may be obtained for five cents each, by addressing the "Commissioner of Patents, Washington, D. C."